United States Patent [19]

NakaMats

[11] Patent Number: 5,218,384
[45] Date of Patent: Jun. 8, 1993

[54] SPECTACLES HAVING PIVOTABLE LENS COVERS

[76] Inventor: Yoshiro NakaMats, 1-10-1105, Minami Aoyama 5-chome, Minato-ku, Tokyo, Japan

[21] Appl. No.: 803,273

[22] Filed: Dec. 5, 1991

Related U.S. Application Data

[62] Division of Ser. No. 511,709, Apr. 20, 1990, Pat. No. 5,120,119, which is a division of Ser. No. 317,312, Mar. 1, 1989, abandoned.

[51] Int. Cl.⁵ .......................... G02C 5/08; G02C 3/00
[52] U.S. Cl. ...................................... 351/63; 351/156; 351/157
[58] Field of Search ................. 351/41, 123, 118, 156, 351/157, 158, 63, 119; 24/3 C; 2/452

[56] References Cited

U.S. PATENT DOCUMENTS 1,130   4/1839  Jachau ................................ 351/119

Primary Examiner—Rodney B. Bovernick
Attorney, Agent, or Firm—Jordan and Hamburg

[57] ABSTRACT

The present invention provides a pair of spectacles comprising a pair of lenses held by the respective lens frames, a side extending backwardly from each of said lens frames and balancing means for eliminating or reducing the load on the nose of a user. Therefore, the spectacles of the present invention requires no or substantially no bridge means for supporting the weight of the spectacles on the nose of the user.

5 Claims, 5 Drawing Sheets

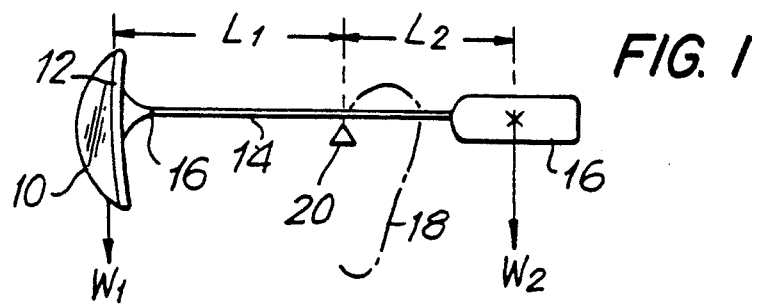
FIG. 1
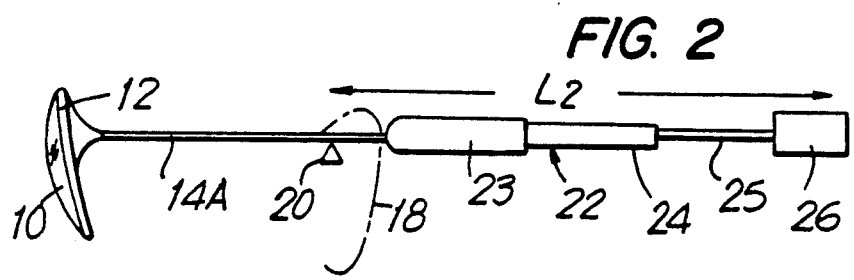
FIG. 2
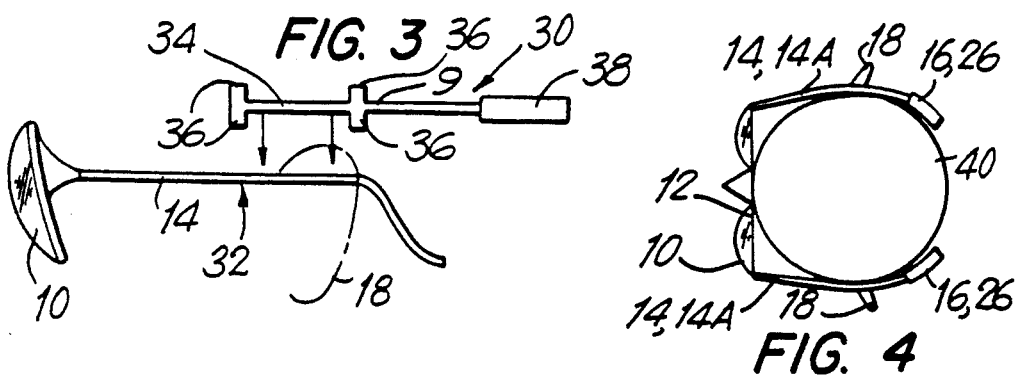
FIG. 3
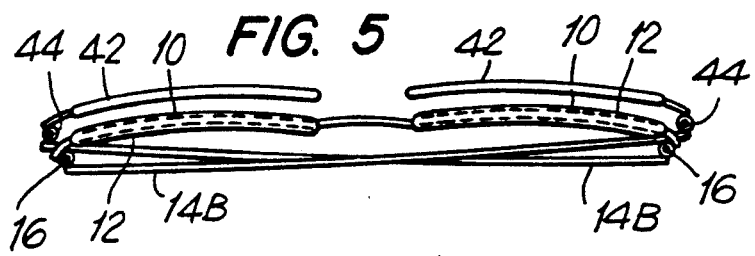
FIG. 4
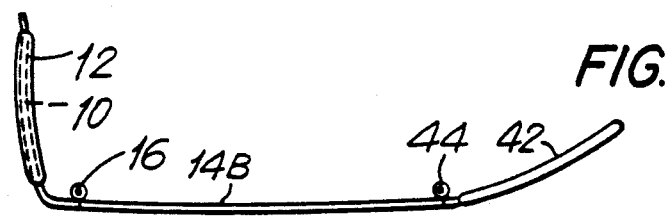
FIG. 5
FIG. 6

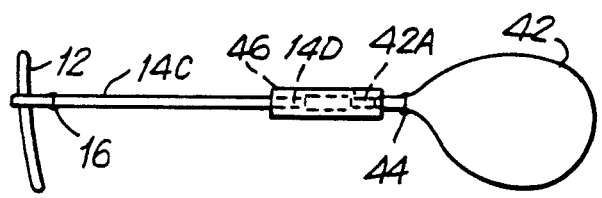
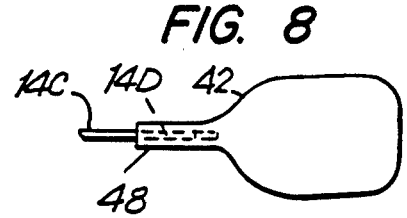
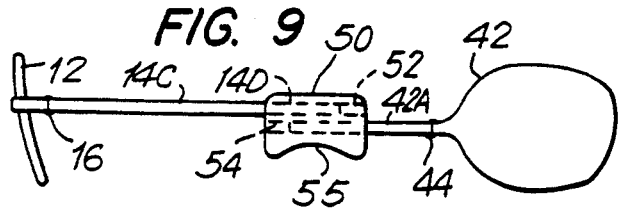
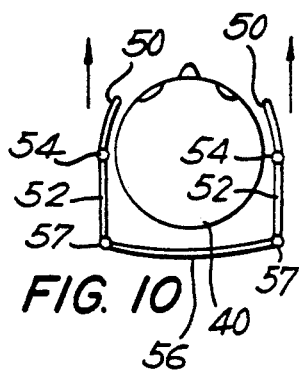
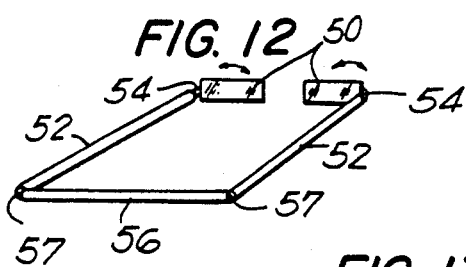
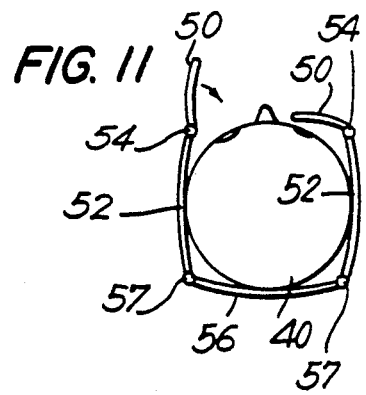
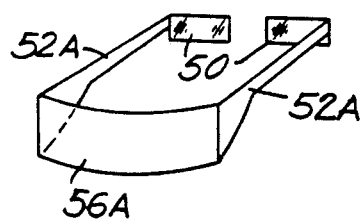
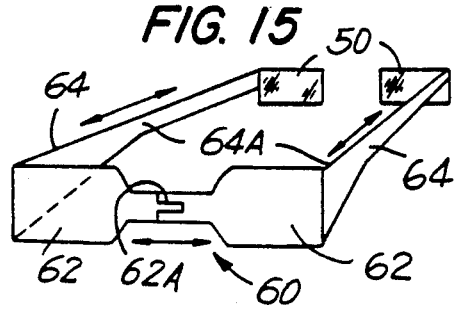
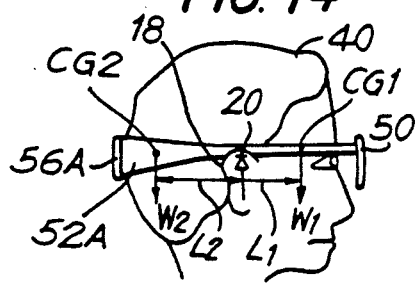

# SPECTACLES HAVING PIVOTABLE LENS COVERS

This is a division of application Ser. No. 07/511,709, filed Apr. 20, 1990 now U.S. Pat. No. 5,120,119, which is a divisional of Ser. No. 317,312 filed Mar. 1, 1989 (now abandoned).

BACKGROUND OF THE INVENTION

1. Field of the Invention

The present invention relates to new spectacles or glasses.

2. Description of the Prior Art

The conventional spectacles generally comprises a pair of spectacle lenses each supported by a lens frame, bridge means for connecting the lens frames with each other and for supporting the weight of the spectacles on the user's nose, and side pivotally connected with each of the lens frames and extending backwardly so that it can be placed on the top of the ear of a user to hold the spectacles against the user's head.

Since the weight of the spectacles is substantially exerted on the user's nose, it is frequent that the user is made unpleasant.

SUMMARY OF THE INVENTION

It is therefore an object of the present invention to provide new spectacles or glasses which will exert no or substantially no weight of the spectacles on the nose of the user.

To this end, the present invention provides a pair of spectacles or glasses which comprises means for balancing the weight of the spectacles such that the load on the nose will be eliminated or reduced.

In one aspect of the invention, the balancing means comprises a counter-weight mounted on the backward end of each of the spectacle sides.

In another aspect of the invention, the balancing means comprises a backward member for connecting the backward end of the spectacle sides with each other.

In such an arrangement, the load on the user's nose can be remarkably reduced or completely eliminated. In some preferred embodiments of the invention, the bridge connecting the lens frames with each other can be omitted.

BRIEF DESCRIPTION OF THE DRAWINGS

The present invention will now be described with reference to the drawings in connection with various embodiments of the present invention. It is to be understood that similar parts are denoted by similar reference numerals throughout the drawings in which:

FIG. 1 is a side view showing one preferred embodiment of a pair of spectacles constructed according to the present invention.

FIG. 2 is a side view similar to FIG. 1, showing the spectacles under another condition.

FiG. 3 is a side view showing a modification of the spectacle shown in FIGS. 1 and 2.

FIG. 4 is a top view of the head of a user on which the spectacles of the present invention shown in FIGS. 1 and 2 is worn.

FIG. 6 is a plan view showing another preferred embodiment of the spectacles according the present invention in a position that the spectacles are folded or closed onto their unused state.

FIG. 6 is a plan view showing the spectacles only on one side, which is opened into its used state.

FIG. 7 is a side view of the spectacles shown in FIGS. 5 and 6.

FIG. 8 is a side view showing a modified connection between each spectacle side and the corresponding counter-weight means.

FIG. 9 is a side view showing a further modified connection between each spectacle side and the corresponding counter-weight means.

FIG. 10 is a top view showing the user's head on which still another embodiment of the spectacles according to the present invention is being worn.

FIG. 11 is a top view similar to FIG. 10, showing the spectacles being mounted into its use state.

FIG. 12 is a perspective view of the spectacles shown in FIGS. 10 and 11.

FIG. 13 is a view similar to FIG. 10, showing a modification of the spectacles shown in FIGS. 10, 11 and 12.

FIG. 14 is a side view of a further embodiment of the spectacles constructed according to the present invention.

FIG. 15 is a perspective view of the spectacles shown in FIG. 14.

DETAILED DESCRIPTION OF THE PREFERRED EMBODIMENTS

Figure 16:
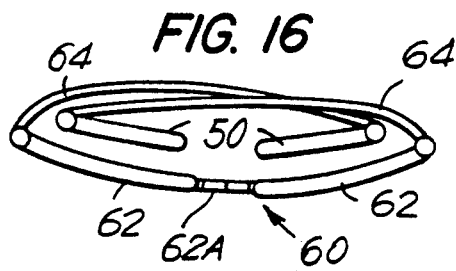
FIG. 16 is a plan view of the spectacles shown in FIGS. 14 and 15 when they are folded into their unused state.

Referring first to FIG. 1, there is shown a pair of spectacles which comprises a pair of spectacle lenses 10 (only one shown) respectively held by lens frames 12, a straight side 14 pivotally connected with each of the lens frames 12 and extending backwardly therefrom, and a counter-weight or balancing element 16 rigidly connected with the backward end of each of the sides 14.

In such an arrangement, the spectacles can be worn on the head of a user at the top of the user's ears 18 such that the weight of the spectacles will be balanced about a point 20 on each ear 18. This may be explained by the following formula:

$$W_1 \times L_1 = W_2 \times L_2$$

where $W_1$ is a weight of each of the lenses 10; $L_1$ a distance between the fulcrum point 20 and each lens 10; $W_2$ a weight of each of the counter-weights 16; and $L_2$ a distance between the fulcrum 20 and each of the counter-weights 16.

As will be appreciated, the moment of the spectacles about the fulcrum 20 can be adjusted by increasing or decreasing the distance $L_2$ between the fulcrum 20 and each of the counter-weights 16. In such a manner, the load on the user's nose can be nullified.

Referring now to FIG. 2, there is shown a pair of spectacles having the same construction as in FIG. 1 except having an extendable spectacle side 14A that is pivotally connected with each of the lens frames 12. The extendable spectacle side 14A includes a telescopic section 22 connected with the backward end thereof. The telescopic section 22 comprises a plurality of nested portions (three in the illustrated embodiment) 23, 24 and 25, with the most-backward nested portion 24 being connected with a counter-weight 26. The length of the telescopic section 22 can be adjusted depending on the weight of the spectacles and/or the position of the user's ears. The variation of the length of the telescopic section 22 permits the counter-weight 26 to be reduced in weight or size. The telescopic section 22 can be contracted when the spectacles are not used.

FIG. 3 shows a modification of the spectacles according to the present invention, in which a balancing member 30 is mounted on the conventional spectacles 32. The balancing member 30 comprises an elongated support portion 34 having four tabs 36 laterally extending therefrom at the opposite sides and a counter-weight 38 rigidly connected with the support portion 34 at the backward end thereof. To mount the balancing member 30 on the conventional spectacles 32, the balancing member 30 is applied to each of the spectacle sides 14 and all the four tabs 36 thereon are then turned in against the inner face of the side 14 to secure the balancing member 30 against the conventional spectacles 32. Any adhering tape or the like may be used to support the balancing member 30 on the spectacles 32 more securely.

As shown in FIG. 4, each of the spectacle sides 14 or 14A may be curved inwardly against the user's head 40 at the counter-weight 16 or 26 to be compatible with the curvature of the user's head.

Referring now to FIGS. 5 and 6, there is shown a further embodiment of the spectacles according to the present invention, which comprises a pair of lenses 10 respectively held by lens frames 12, a spectacle side 14B pivotally connected with each of the lens frames 12 at 16, and a counter-weight or balancing member 42 pivotally connected at 44 with the backward end of each of the spectacle sides 14B. In this embodiment, the balancing member 42 also serves as a cover for protecting the respective lens 10 when the spectacles are folded into the unused state. The cover 42 is preferably made of a soft material such as plastics or rubber and/or formed to have a relatively extended shape. At this time, the cover or balancing member 42 will engage the user's head more softly while stabilizing the spectacles on the user's head.

In the embodiment of FIGS. 5 and 6, the lens cover 42 may have its weight which does not function as a balancing counter-weight as in the previous embodiments, since the lens cover 42 can engage the user's head to hold the spectacle more securely without load on the user's nose.

FIG. 7 shows a modification of the spectacles shown in FIGS. 5 and 6, which comprises a resilient connecting tube 46 for connecting the backward cut end 14D of each of the spectacle side 14C with the forward cut end 42A of the corresponding lens cover 42. The length of each of the side sections in the spectacles can be adjusted by moving the cut ends of the side and cover relative to each other within the connecting tube 46.

FIG. 8 shows another modification which comprises a connecting tube 48 formed integrally in the forward portion of the lens cover 42. The connecting tube 48 receives the backward cut end 14D of each of the spectacle side 14C to secure it on the spectacles. Also at this case, the length of the side section can by adjusted by moving the backward cut end 14D of the spectacle side 14C within the connecting tube 48.

In FIG. 9, the backward cut end 14D of each of the spectacle sides 14C is connected with the forward cut end 42A of the lens cover 42 through a connecting tube 50. The connecting tube 50 is formed with two through-holes 52 and 54 spaced away from one above another and parallel to each other. Each of these through-holes 52 or 54 receives the corresponding cut ends of the spectacle side or lens cover. The length of the side sections in the spectacles can be adjusted by moving the cut ends of the respective parts within the connecting tube 50. The connecting tube 50 also includes a curved bottom 55 formed therein which is adapted to be placed on the top of the user's ear.

Referring now to FIGS. 10, 11 and 12, there is shown a further embodiment of the present invention, in which an improved pair of spectacles comprises a pair of lenses 50 each pivotally connected at 54 with the forward end of each of spectacle sides 52, and a backward connecting member 56 pivotally connected between the backward ends of the spectacle sides 52 at pivots 57. Such an arrangement requires no bridge for connecting between the spectacle lenses.

On use, the spectacles are mounted backwardly on the user's head 40 and then the lenses 50 are turned inwardly about the respective pivots 54 to place on the appropriate front of the user's face.

FIGS. 13 and 14 illustrate a modification of the spectacles shown in FIGS. 10 through 12, in which the backward connecting member 56A and the backward ends portion of the spectacle sides 52A are widened. The distribution of weight in the spectacles is so designed that when the spectacles are worn on the user's head 40 as shown in FIG. 14, the aforementioned formula, $L_1W_1 = L_2W_2$, is fulfilled where $W_1$ is a weight on the center of gravity CG1 in the side section between the fulcrum 20 on the ear 18 and the corresponding lens 50; $W_2$ a weight on the center of gravity CG2 in the side section between the fulcrum 20 and the backward connecting member 56A; $L_1$ a distance between the fulcrum 12 and the center of gravity CG1 and $L_2$ a distance between the fulcrum 12 and the center of gravity CG2. In such a case, the weight of the spectacles about the fulcrums 12 on the user's ears 18 can be appropriately balanced without any bridge which would be required to support the spectacles on the user's nose in the prior art.

FIGS. 15 and 16 show a further modification of the spectacles shown in FIGS. 10 through 14, in which a backward connecting member 60 is divided into two backward sections 62. These backward sections 62 are connected with each other through an extendable connection 62A such that the length of the backward connecting member 60 can be adjusted to accommodate the size of the user's head. It is also preferred that each of the spectacle sides 64 is formed to extend its length through a extendable connection 64A. It is further preferred that each of the backward sections 62 is of substantially the same size and shape as those of each lens 50. In such a case, when the spectacles are folded into their unused state, the backward sections 62 can cover and protect the spectacle lenses 50.

Figure 17:
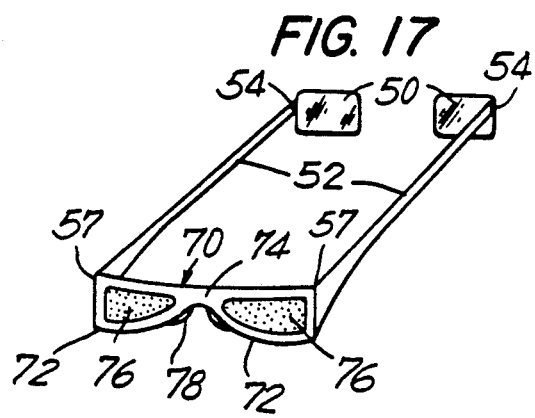
FIG. 17 is a perspective view showing a modification of the spectacles shown in FIGS. 14, 15 and 16.

A pair of spectacles shown in FIG. 17 has substantially the same construction as that of the spectacles shown in FIGS. 10 through 13 except that the backward connecting member 70 is divided into two backward lens frames 72 which are connected with each other through a bridge 74. Each of the backward lens frames 72 holds a colored lens 76. The spectacles also has pad bridges 78 each of which is formed integrally with the corresponding backward lens frame 72.

The spectacles shown in FIGS. 17 can be used as a pair of sunglasses in the opposite manner as in FIG. 14. In other words, the backward connecting member 70 can be placed on the front of the user's face as in the conventional glasses. At this time, it is of course that the spectacles of the present invention is used through the bridge 74 and the pad bridges 78 in the same manner as in the conventional spectacles.

Figure 18:
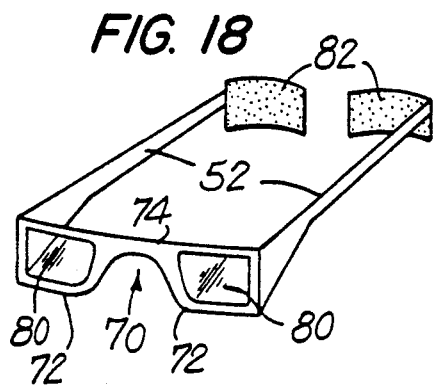
FIG. 18 is a perspective view showing a further modification of the spectacles shown in FIGS. 14, 15 and 16.

FIG. 18 shows the opposite arrangement as that of the spectacles shown in FIG. 17. In other words, the colored lenses 76 held by the backward lens frames 72 are replaced by transparent lenses 80 while the forward transparent lenses 50 are replaced by colored lenses 82.

Figure 19:
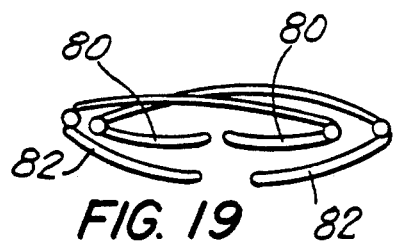
FIGS. 19 and 20 are plan views respectively showing further modifications of the spectacles shown in FIGS. 14 through 17, which can be folded in different manners.

FIG. 19 shows the spectacles of FIG. 18 when they are folded into their unused state in a different manner as that of the spectacles shown in FIG. 16. That is, the lenses 80 on the backward connecting member 70 are covered by the forward lenses 82.

Figure 20:
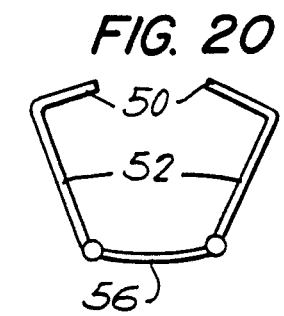

FIG. 20 shows a modification of the spectacles as shown in FIG. 12, in which each of the forward lenses 50 is connected integrally with the respective one of the spectacle sides 52 which in turn is pivotally connected with the backward connecting member 56.

Figure 21:
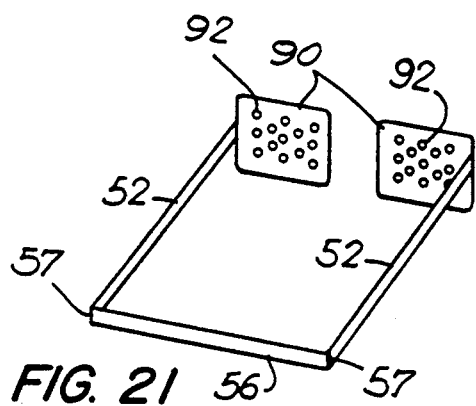
FIG. 21 is a perspective view of a further modification of the spectacles according to the present invention.

FIG. 21 shows a further modification of the spectacles according to the present invention, which is different from the spectacles shown in FIGS. 10 to 12 only in that the forward lenses are replaced by colored lenses 90 including a plurality of transparent portions 92 in the form of small apertures.

Figure 22:
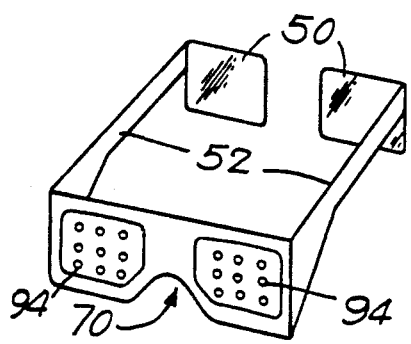
FIG. 22 is a perspective view of a still further modification of the spectacles according to the present invention.

FIG. 22 shows a further modification in which the colored lenses shown in FIG. 17 are replaced by the same colored lenses 94 as the colored lenses 90 shown in FIG. 21.

Figure 23:
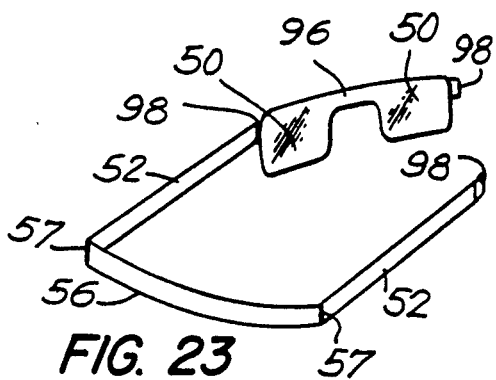
FIG. 23 is a perspective view of a further modification of the spectacles according to the present invention.

FIG. 23 shows the same arrangement as that of the spectacles shown in FIGS. 10 to 12, except that the forward lenses 50 are rigidly connected with each other through a central connection 96 to form a forward lens assembly. The forward lens assembly is pivotally connected at one end with one of the spectacle sides 52, the other end of the forward lens assembly being detachably connected with the other spectacle 52 as through a hook-latch connection 98.

Figure 24:
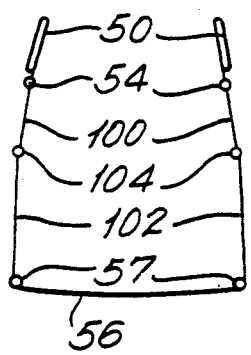
FIG. 24 is a plan view of a further modification of the spectacles according to the present invention in its fully opened state, which can be closed into their unused state in a different manner.
Figure 25:
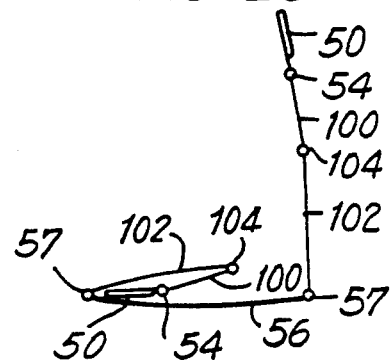
FIG. 25 is a view similar to FIG. 24, showing the spectacles being folded into its unused state.
Figure 26:
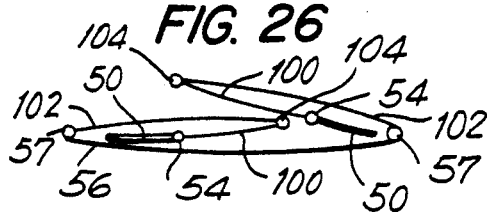
FIG. 26 is a view similar to FIGS. 24 and 25, showing the spectacles which has been substantially completely closed into their unused state.

FIG. 24 shows a further modification of the spectacles as shown in FIGS. 10 to 12, in which each of the spectacle sides 52 is divided into two side sections 100 and 102. The side sections 100 and 102 are pivotally connected with each other through a pivot 104. As can be seen from in FIGS. 25 and 26, such spectacles can be folded into a more compact state than those of the previous embodiments.

Figure 27:
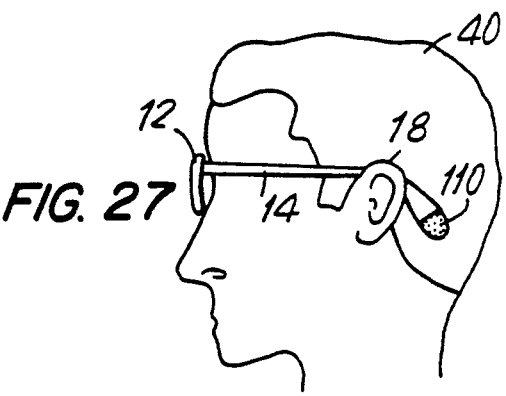
FIG. 27 is a side view showing a further embodiment of the spectacles according to the present invention in its used state wherein it is worn on the user's head.

Referring now to FIG. 27, there is shown a pair of spectacles having substantially the same construction as shown in FIGS. 1 through 4, except that a flat permanent magnet 110 is mounted on the backward end of each of the spectacle sides 14. Such a permanent magnet 110 may influence the flow of blood within the user's head 40 near his ear 18.

Figure 28:
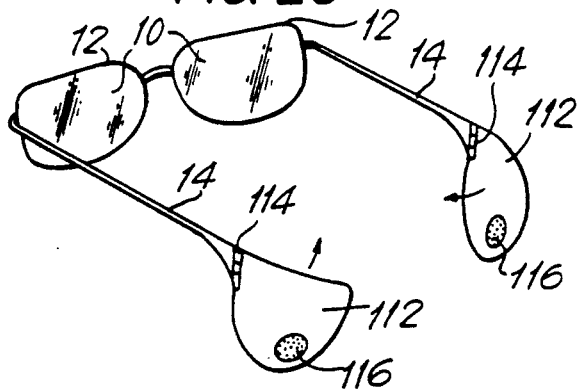
FIG. 28 is a perspective view showing a modification of the spectacles shown in FIG. 27.

FIG. 28 shows a modification of the spectacles shown in FIG. 27 in which the spectacles have a flat pad 112 pivotally connected with the backward end of each of the spectacle sides 14 through a hinge 114. When such spectacles are worn on the user's head, each of the pads 112 are turned against the user's head about the respective hinge 114 to hold the spectacles on the user's head more securely. It may be preferred that a permanent magnet 116 is mounted on each of the pads 112.

Figure 29:
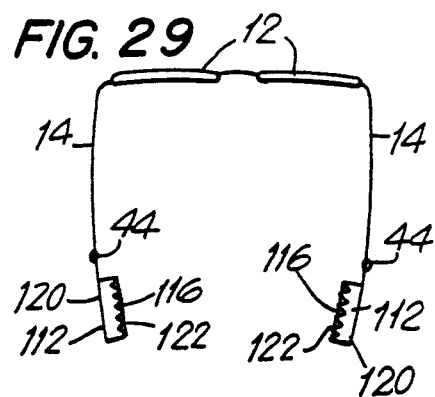
FIG. 29 is a plan view showing another modification of the spectacles shown in FIGS. 27 and 28.
Figure 30:
FIG. 30 is a perspective view of the counter-weight used in the spectacles of FIG. 29.

Referring to FIGS. 29 and 30, each of the permanent magnets 116 to be mounted on the respective pad 112 may be located within a crown-shaped receptacle 120.

The receptacle 120 has a plurality of sawteeth 122 formed thereon at its opened edge.

Figure 31:
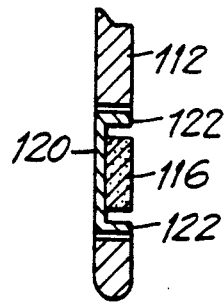
FIG. 31 is a cross-sectional view showing the backward end of one side of the spectacles in which a modified counter-weight is mounted.

Such an assembly consisting of the magnet 116 and the receptacle 120 may be embedded in each of the pads 112, as shown in FIG. 31.

In such an arrangement, the magnet assembly can increase the strength of the magnetic field created between the magnet 116 and the receptacle 120 while providing a mechanical stimulus to the user's head. Furthermore, any slippage between the backward ends of the spectacle sides and the user's head can be reduced by the magnet assemblies in the pads 112.

Figure 32:
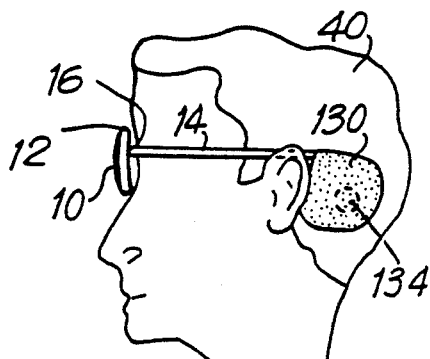
FIG. 32 is a side view showing a further embodiment of the spectacles according to the present invention.
Figure 33:
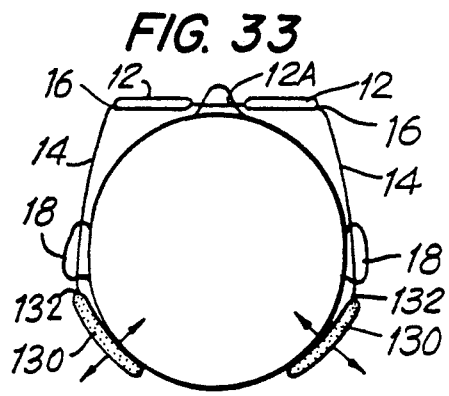
FIG. 33 is a plan view of the spectacles shown in FIG. 32.

FIGS. 32 and 33 show a pair of spectacles similar to those shown in FIG. 28, in which they comprise a pair of lenses 10 held by the respective lens frames 12, a bridge 12A connecting the lens frames 12 with each other and a pair of spectacle sides 14 each pivotally coupled at 16 with one of the lens frames 12. In this embodiment, a soft pad 130 is pivotally connected at 132 with the backward end of each of the spectacle sides 14. When the spectacles are worn on the user's head at his ears 18, the soft pads 130 are turned inwardly against the user's head 40 such that the inward face of each of the soft pads 130 will engage a recess 134 in the backward neck portion of the user's head 40. This assures that the entire weight of the spectacles can be supported by the soft pads 130 without any load on the user's nose. It may be preferred that each of the soft pads 130 is resiliently biased against the user's head under the action of any suitable spring means (not shown).

Furthermore, each of the soft pads 130 may include a counter-weight (not shown) embedded therein or a battery (not shown) which can supply a power to any electric equipment such as liquid crystal layers used to control the transparency in the lenses.

Figure 34:
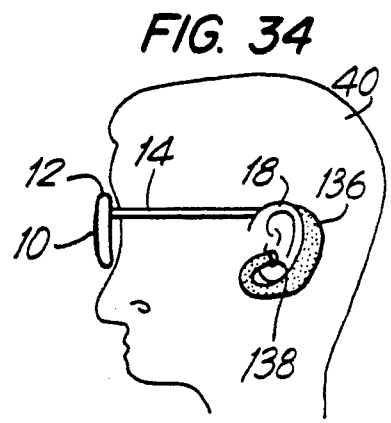
FIG. 34 is a side view showing a modification of the spectacles shown in FIGS. 32 and 33.

FIG. 34 shows a modification of the spectacles shown in FIGS. 32 and 33, in which a soft pad 136 connected with the backward end of each of the spectacle sides 14 is coiled with the free end thereof engaging a recess 138 in each of the user's ears 18. Thus, the spectacles can be supported more securely on the user's head.

Figure 35:
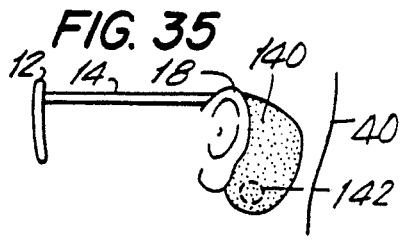
FIG. 35 is a side view showing another modification of the spectacles shown in FIGS. 32 and 33.
Figure 36:
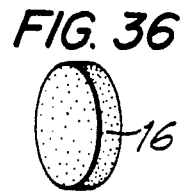
FIG. 36 is a perspective view showing a modified counter-weight preferably used in the present invention.

FIG. 35 shows a further modification of the spectacles shown in FIGS. 32 through 34, in which a soft pad 140 connected with the backward end of each of the spectacle sides 14 extends further downwardly along each of the user's ears 18. The bottom end of each of the soft pads 140 includes a permanent magnet 142 embedded therein, which may influence the flow of blood under the skin of the user's head 40.

Figure 37:
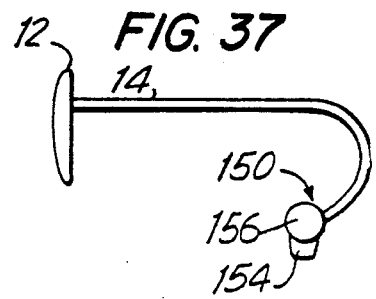
FIG. 37 is a side view illustrating a further embodiment of the spectacles according to the present invention.
Figure 38:
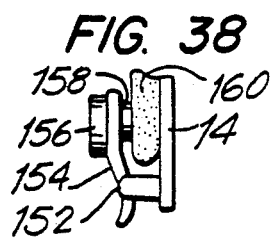
FIG. 38 is a side view of the balancing member shown in FIG. 37.
Figure 39:
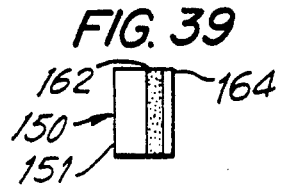
FIG. 39 is a side view illustrating the details of the earring used in the balancing member of FIGS. 37 and 38.

Referring now to FIGS. 37, 38 and 39, there is shown a balancing member 150 also serving as a decorative and holding member. The balancing member 150 includes a stub 152 rigidly connected with the backward curved end of each of the spectacle sides 14. A clamp 154 is pivotally connected with the outward end of the stub 152 and resiliently biased against the spectacle side 14 under the action of spring means (not shown). An ear-ring 156 is rigidly mounted on the outer face of each of the clamps 154. As shown in FIG. 39, each of the ear-ring 156 may include a decorative element 151 which can take a combination of various sizes, shapes and colors, a pressure-sensitive adhesive layer 162 which can be used to adhere that decorative element to the outer face of each of the clamps 154. When the decorative element 151 is unused, a release liner 164 is applied over the pressure-sensitive adhesive layer 162.

The balancing member 150 is utilized to hold the spectacles against the user's head when the earlobe 160 of each of the user's ears is held between the clamp 154 and the backward end of the respective spectacle side. At this time, any suitable decorative element 156 may be attached to each of the clamps 154. It may be further preferred that a permanent magnet 158 is mounted on the inner face of each of the clamps 154. Such a permanent magnet 158 serves to promote the flow of blood in the user's head and also to support the spectacles on the user's head in addition to the clamps 154 holding the spectacles.

Figure 40:
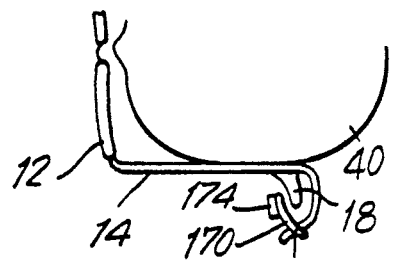
FIG. 40 is a fragmentary plan view of a further embodiment of the spectacles according to the present invention.

FIG. 40 shows a modification of the spectacles shown in FIGS. 37 to 39, in which the backward end of each of the spectacle sides 14 is turned outwardly to extend behind the user's ear. The tip of the spectacle side is spaced laterally from the corresponding ear of the user when the spectacles are worn on the user's head 40. A clamp 170 is pivotally mounted on the tip of the spectacle side 14 and resiliently biased against the portion of the spectacle side just behind the tip thereof.

This arrangement functions to displace the outer edge of the user's ear 18 outwardly such that any external sound may be taken by that ear more clearly. Since the outer edge of the user's ear is held between the clamp 170 and the backward end of the spectacle side 14, the user cannot be made unpleasant.

Figure 41:
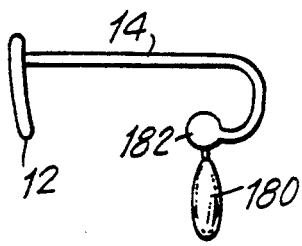
FIG. 41 is a fragmentary plan view of a further embodiment of the spectacles according to the present invention.

Any suitable decorative element 174 may be removably attached to the outer face of each of the clamps 170. FIG. 41 shows a still further modification of the spectacles shown in FIGS. 37 to 39, in which a decorative element 180 is supported from the rounded tip of the U-shaped backward end of each spectacle side 14. The decorative element 180 serves as a balancing member or counter-weight in the spectacles.

Figure 42:
FIG. 42 is a fragmentary longitudinal cross-section of a further embodiment of the spectacles according to the present invention.
Figure 43:
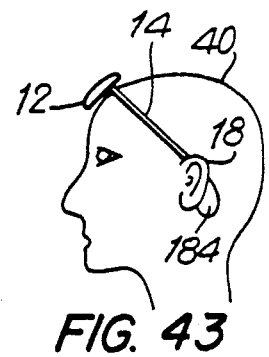
FIG. 43 is a side view showing a further embodiment of the spectacles according to the present invention when they are shifted into their unused position.

As shown in FIG. 42, it is preferred that the spectacles of the present invention has two sides 14 each of which is of a flat rectangular cross-section since such cross-section applies a gentle pressure against the tops of the user's ears 18.

The spectacles having its balancing members on the backward ends of the spectacle sides 14 may be held at a position in which the forward lens frames 12 are located adjacent to the top of the user's head 40, under the influence of the balancing members 184.

In accordance with the present invention, further, any suitable electric equipment such as hearing aid, audiphone, radio receiver or the like may be embedded in the pad connected with the backward end of the spectacle side.

I claim:

1. Spectacles comprising a lens frame mounting lenses, side members pivotably connected to said lens frame, lens covers pivotably connected to said side members, said side members and said lens covers being pivotable to a folded position in which said side members, said lens frame and said lens covers generally overlie one another in parallel array with said lens frame being sandwiched between said side members and said lens covers, said lens frame having outer ends with the distance between said outer ends being designated as the lens frame width, each of said side members having a forward end and a rear end with the distance between said forward and rear ends being designated as the side members length, said lens frame width being substantially equal to said side member length, said lens frame comprising two lens mounting sections and a bridge connecting said two lens mounting sections, said bridge having bridge ends connected to said lens mounting sections, each of said lens covers having a forward end pivotably connected to said rear end of each of said side members and a rear terminating end with the distance between said lens cover forward end and said terminating end being designated as the lens cover width, each of said lens covers having a lens cover height which extends perpendicular to said lens cover width, the distance between said bridge ends and the forward end of each of said side pieces being designated as the lens mounting section width, each of said lens mounting sections having a lens mounting section height which extends perpendicular to said lens mounting section width, said lens mounting section width being substantially equal to said lens cover width, and said lens cover height being substantially equal to said lens mounting section height such that when said spectacles are in said folded position, said lens covers extend substantially over the entire width and height of said lenses to thereby protect said lenses.

2. Spectacles according to claim 1, wherein said lens covers comprise counter-weights balancing the weight of said spectacles such that the weight times distance of the spectacles forward of a person's ear wearing the spectacles is equal to the weight times distance of the spectacles to the rear of said person's ear.

3. Spectacles according to claim 1, wherein said lens covers are made of soft rubber.

4. Spectacles according to claim 1, wherein said lens covers are made of soft plastic.

5. Spectacles comprising a lens frame mounting lenses, side members pivotably connected to said lens frame, lens covers pivotably connected to said side members, said side members and said lens covers being pivotable to a folded position in which said side members, said lens frame and said lens covers generally overlie one another in parallel array with said lens frame being sandwiched between said side members and said lens covers, said lens frame having outer ends with the distance between said outer ends being designated as the lens frame width, each of said side members having a forward end and a rear end with the distance between said forward and rear ends being designated as the side member length, said lens frame width being substantially equal to said side member length, said lens frame comprising two lens mounting sections and a bridge connecting said two lens mounting sections, said bridge having bridge ends connected to said lens mounting sections, each of said lens covers having a forward end pivotably connected to said rear end of each of said side members and a rear terminating end with the distance between said lens cover forward end and said terminating end being designated as the lens cover width, the distance between said bridge ends and the forward end of each of said side pieces being designated as the lens mounting section width, said lens mounting section width being substantially equal to said lens cover width, said lens covers each having a size and configuration substantially equal to the size and configuration of each respective lens such that when said spectacles are in said folded position, said lens covers extend substantially over the entire respective lens to thereby protect each lens.

* * * * *